(12) United States Patent
Sturgeon et al.

(10) Patent No.: US 12,291,253 B2
(45) Date of Patent: May 6, 2025

(54) WAGON LOCK

(71) Applicant: The Radio Flyer Company, Chicago, IL (US)

(72) Inventors: Samantha Sturgeon, Chicago, IL (US); Anne Goodman, Chicago, IL (US)

(73) Assignee: The Radio Flyer Company, Chicago, IL (US)

( * ) Notice: Subject to any disclaimer, the term of this patent is extended or adjusted under 35 U.S.C. 154(b) by 311 days.

(21) Appl. No.: 17/967,974

(22) Filed: Oct. 18, 2022

(65) Prior Publication Data

US 2023/0117703 A1  Apr. 20, 2023

Related U.S. Application Data

(60) Provisional application No. 63/257,323, filed on Oct. 19, 2021.

(51) Int. Cl.
B62B 3/02 (2006.01)

(52) U.S. Cl.
CPC ............ B62B 3/02 (2013.01); *B62B 2205/24* (2013.01)

(58) Field of Classification Search
CPC ........... B62B 3/02; B62B 3/025; B62B 3/027; B62B 2205/24; B62B 2205/20
See application file for complete search history.

(56) References Cited

U.S. PATENT DOCUMENTS

| | | | | |
|---|---|---|---|---|
| 4,813,701 A | * | 3/1989 | Balland | B62B 3/027 |
| | | | | D12/129 |
| 5,454,584 A | * | 10/1995 | Haut | B62B 7/08 |
| | | | | 297/16.2 |
| 5,876,057 A | * | 3/1999 | Huang | B62B 7/08 |
| | | | | 280/658 |
| 5,988,671 A | * | 11/1999 | Abelbeck | B62B 1/12 |
| | | | | 280/649 |
| 7,077,420 B1 | * | 7/2006 | Santoski | B62B 7/062 |
| | | | | 280/647 |
| 8,191,919 B2 | * | 6/2012 | Wang | B62B 7/083 |
| | | | | 280/649 |
| 8,870,215 B2 | * | 10/2014 | Li | B62B 7/06 |
| | | | | 280/647 |
| 9,085,311 B1 | * | 7/2015 | Chen | B62B 3/001 |
| 9,233,700 B1 | * | 1/2016 | Elden | B62B 1/266 |
| 10,081,380 B2 | * | 9/2018 | Fitzwater | B62B 3/007 |
| 10,407,088 B1 | * | 9/2019 | Le | B62B 5/065 |

* cited by examiner

*Primary Examiner* — John D Walters
(74) *Attorney, Agent, or Firm* — Barnes & Thornburg LLP

(57) ABSTRACT

A lock is provided for a folding wagon to secure the wagon frame in the folded position when desired. The lock has an arm that has a receiver at a first end and a latch at a second end. The receiver is secured to a first frame member of the folding wagon. The latch has a ramp and a shoulder. The arm is able to be flexed to allow the shoulder to engage a second frame member of the folding wagon when the folding wagon is moved to a folded position, and to allow the shoulder to disengage from the second frame member when the latch is flexed downwardly.

20 Claims, 5 Drawing Sheets

WAGON LOCK

CROSS-REFERENCE TO RELATED APPLICATIONS

This application claims the benefit of U.S. Provisional Patent Application No. 63/257,323 filed Oct. 19, 2021, which is expressly incorporated herein by reference and made a part hereof.

FEDERALLY SPONSORED RESEARCH OR DEVELOPMENT

Not Applicable.

TECHNICAL FIELD

The present subject matter relates to a lock, and more particularly, to a lock for a folding wagon to retain the wagon in the folded orientation.

BACKGROUND

Folding wagons are known in the art. While such products according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a lock for a folding wagon to releasably secure the folding wagon in a folded position.

The disclosed technology further relates to a folding mechanism for a scooter to transition the scooter from a use position to a folded position, comprising: an upper housing.

The disclosed technology further relates to a lock for a folding wagon, the folding wagon having a first frame member and an opposing second frame member, and a folding mechanism connecting the first frame member with the second frame member, the lock comprising: an arm having a first end and a second end; a receiver adjacent the first end of the arm, the receiver fixably connected to the first frame member of the wagon, the receiver comprising two opposing flanges extending from the arm; and, a latch adjacent the opposing second end of the arm, wherein the latch has a ramp and a shoulder, the ramp having a first end and a second end, the ramp extending from approximately the second end of the arm at an acute angle upward from the arm toward the first end of the arm, the shoulder extending from the second end of the ramp at a transverse angle to the arm and toward a top surface of the arm, wherein the shoulder is adapted to engage the second frame member when the folding wagon is moved to a folded position, and wherein the shoulder is adapted to disengage from the second frame member when the latch is moved downwardly.

The disclosed technology further relates to a lock for a folding wagon, the folding wagon having a first frame member and an opposing second frame member, and a folding mechanism connecting the first frame member with the second frame member, the lock comprising: an arm having a first end and a second end; a receiver adjacent the first end of the arm, the receiver secured to the first frame member of the wagon; and, a latch adjacent the second end of the arm, wherein the latch has a ramp and a shoulder, and wherein the arm flexes to allow the shoulder to engage the second frame member when the folding wagon is moved to a folded position and to allow the shoulder to disengage from the second frame member when the latch is flexed downwardly.

The disclosed technology further relates to a lock for a folding wagon, the folding wagon having a first frame member and an opposing second frame member, and a folding mechanism connecting the first frame member with the second frame member, the lock comprising: an arm having a first end and a second end; a receiver adjacent the first end of the arm, the receiver connected to the first frame member of the wagon, the receiver comprising two opposing flanges extending from the arm; and, a latch adjacent the opposing second end of the arm, wherein the latch has a ramp and a shoulder.

The disclosed technology further relates to a lock for a folding wagon, wherein the receiver comprises two opposing flanges extending generally transverse to a longitudinal axis of the arm to receive the first frame member.

The disclosed technology further relates to a lock for a folding wagon, wherein the receiver comprises two opposing flanges extending generally parallel to a longitudinal axis of the arm to receive the first frame member.

The disclosed technology further relates to a lock for a folding wagon, further comprising fasteners to secure the receiver to the first frame member.

The disclosed technology further relates to a lock for a folding wagon, further comprising a gusset between the receiver and the arm.

The disclosed technology further relates to a lock for a folding wagon, wherein the ramp has a length less than 30% of an overall length of the lock.

The disclosed technology further relates to a lock for a folding wagon, wherein the ramp does not extend all the way to the first end of the arm.

The disclosed technology further relates to a lock for a folding wagon, wherein the shoulder extends generally perpendicular to the arm.

The disclosed technology further relates to a lock for a folding wagon, wherein the lock is made of a plastic material, and wherein the second end of the arm is adapted to flex to engage and disengage the shoulder from the second frame member.

The disclosed technology further relates to a lock for a folding wagon, wherein the receiver comprises two opposing flanges extending from the arm.

The disclosed technology further relates to a lock for a folding wagon, wherein the ramp has a first end and a second end, the ramp extending from approximately the second end of the arm at an acute angle upward from the arm toward the first end of the arm, the shoulder extending from the second end of the ramp at a transverse angle to the arm and toward a top surface of the arm.

The disclosed technology further relates to a lock for a folding wagon, wherein the lock is made of a plastic material.

The disclosed technology further relates to a lock for a folding wagon, wherein the ramp has a first end and a second end, the ramp extending from approximately the second end of the arm at an acute angle upward from the arm toward the first end of the arm, the shoulder extending from the second end of the ramp at a transverse angle to the arm and toward a top surface of the arm, wherein the shoulder is adapted to engage the second frame member when the folding wagon is moved to a folded position, and wherein the shoulder is adapted to disengage from the second frame member when the latch is moved downwardly.

The disclosed technology further relates to a lock for a folding wagon, further comprising a fastener to secure the receiver to the first frame member.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings.

Figure 1:
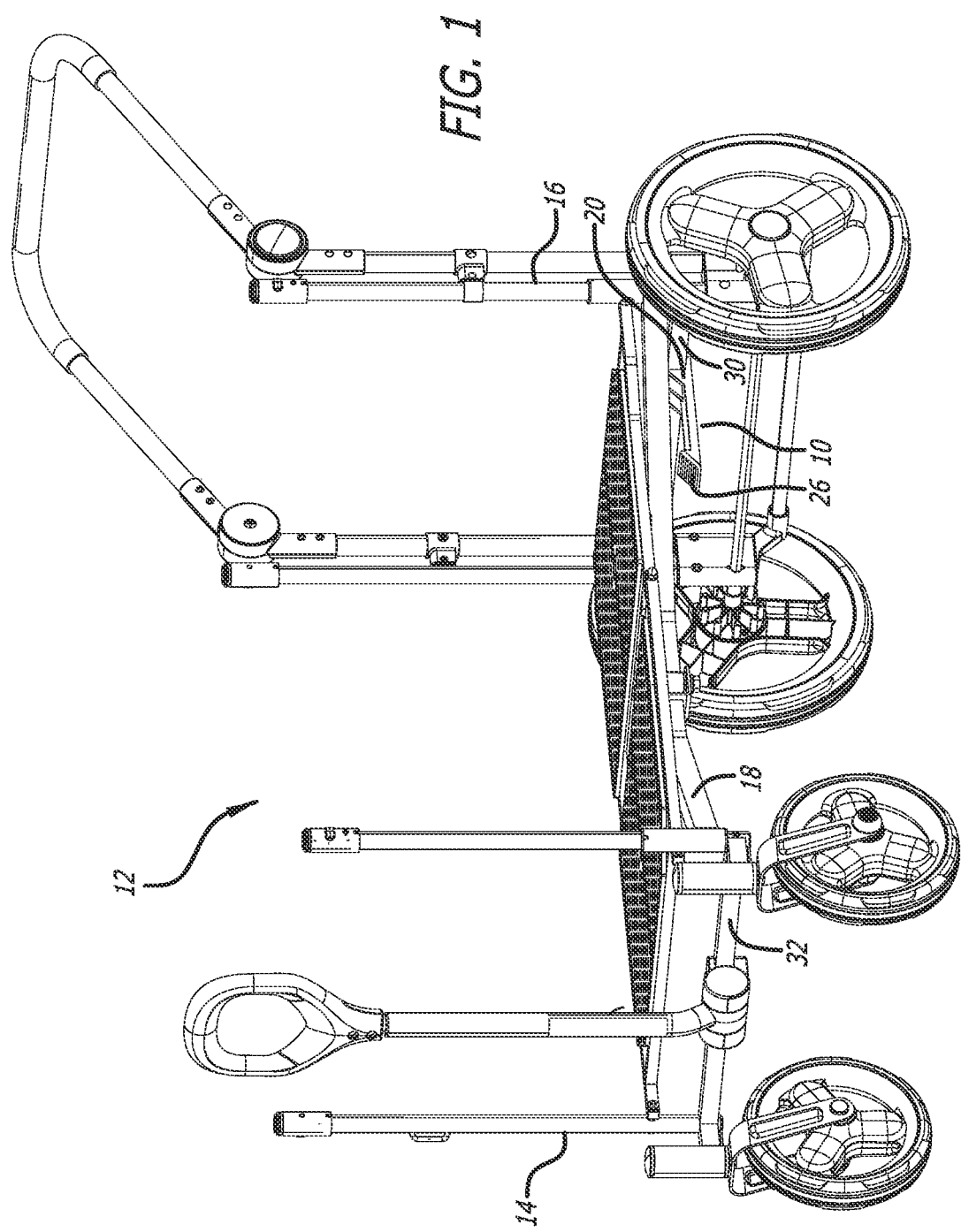
FIG. 1 is a front perspective view of a folding wagon with a first embodiment of a lock according to the present disclosure, where the wagon is in the use position.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Figure 2:
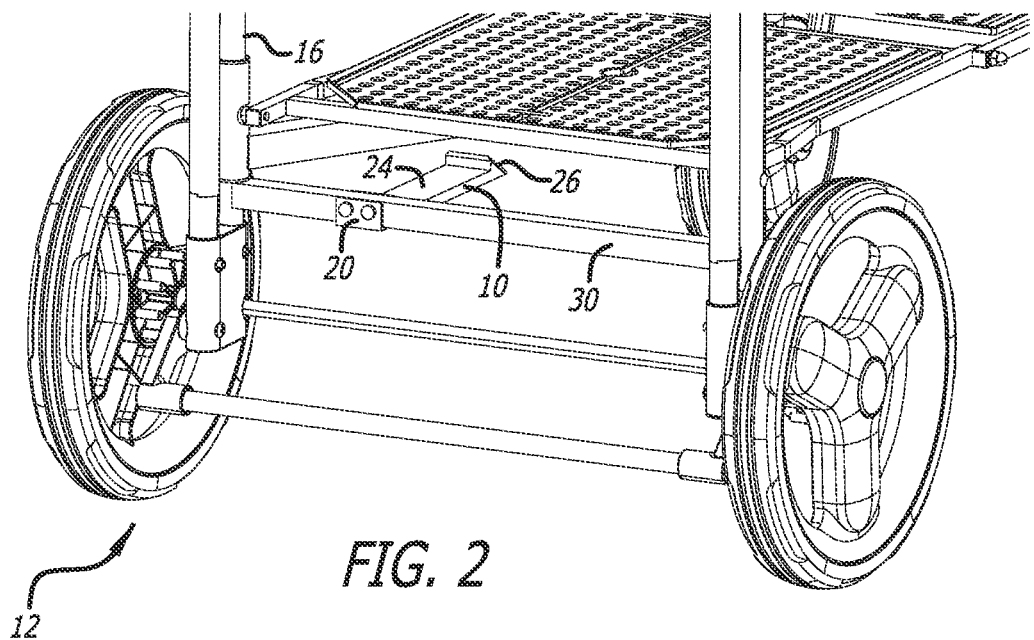
FIG. 2 is a partial rear perspective view of the wagon and lock of FIG. 1, according to the present disclosure.
Figure 3:
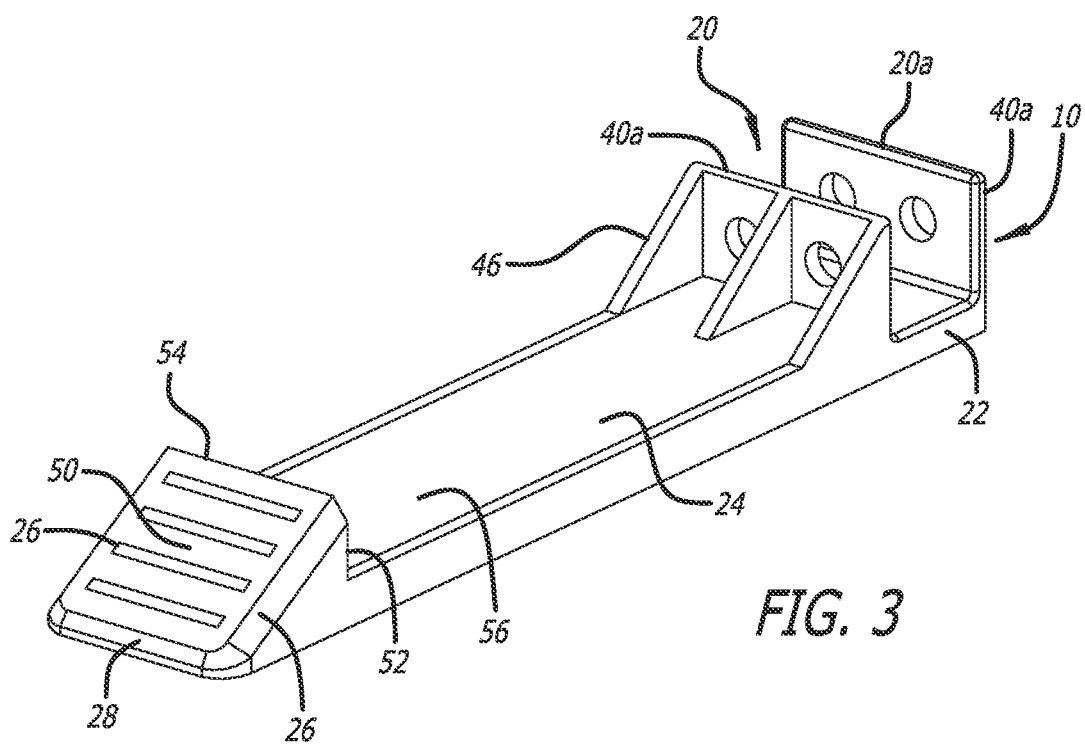
FIG. 3 is a front perspective view of the lock shown in FIG. 1, according to the present disclosure.
Figure 5:
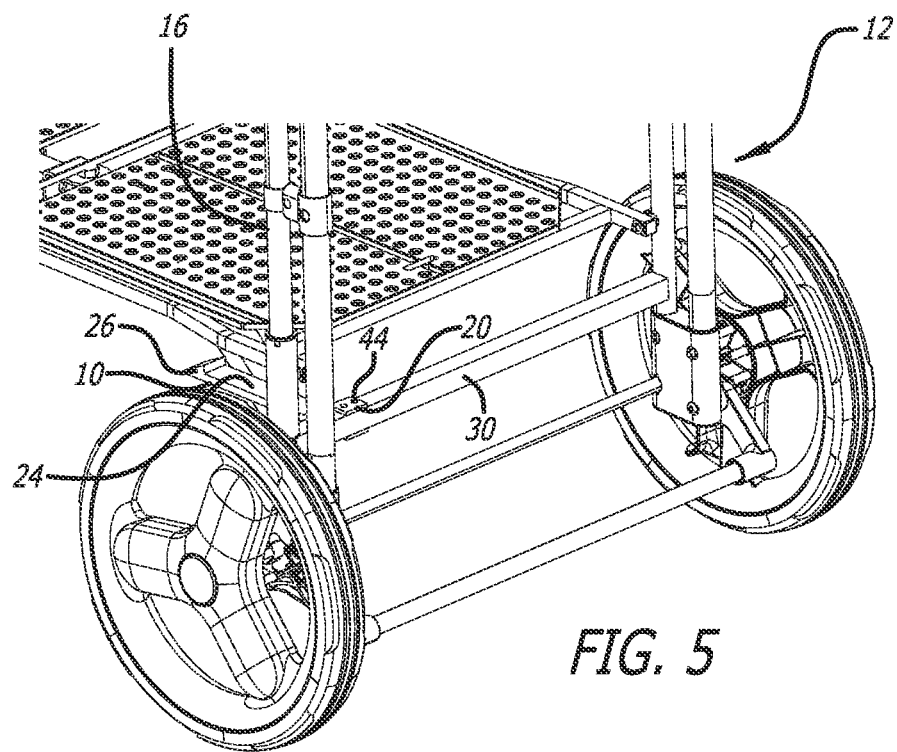
FIG. 5 is a rear perspective view of a folding wagon with a second embodiment of a lock according to the present disclosure, with the wagon in the use position.
Figure 8:
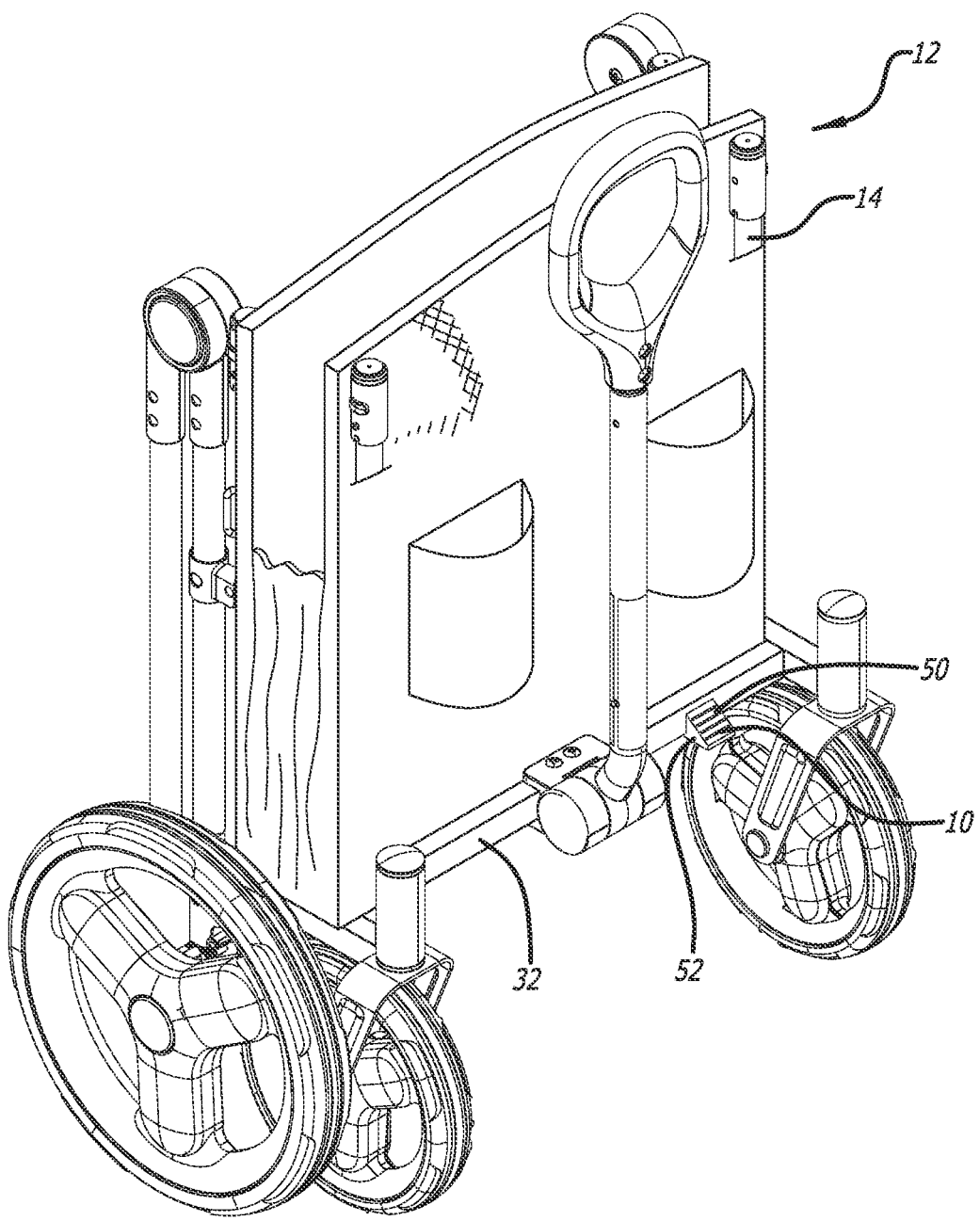
FIG. 8 is a front perspective view of the wagon and lock of FIG. 1, according to the present disclosure, where the wagon is in the folded position and the lock is engaged with the front frame of the wagon.

Generally, this disclosure describes various embodiments of lock 10 for a folding wagon 12. In one embodiment the wagon 12 has a first frame 14, a second frame 16 and a folding mechanism 18. In one embodiment, the first frame 14 is a front frame, the second frame 16 is a rear frame, and the folding mechanism 18 is a hinge connecting the first frame 14 with the second frame 16. It is understood, however, that the first frame may be any frame of the wagon, the second frame may similarly be any frame of the wagon, and the folding mechanism may be a mechanism other than a hinge. The wagon 12 preferably is able to transition between a first or use position, as shown in FIGS. 1, 2 and 5, and a second or folded position, as shown in FIG. 8. The lock 10 is provided to releasably retain the wagon 12 in the folded position until released by the user to transition the wagon 12 to the use position.

Figure 4:
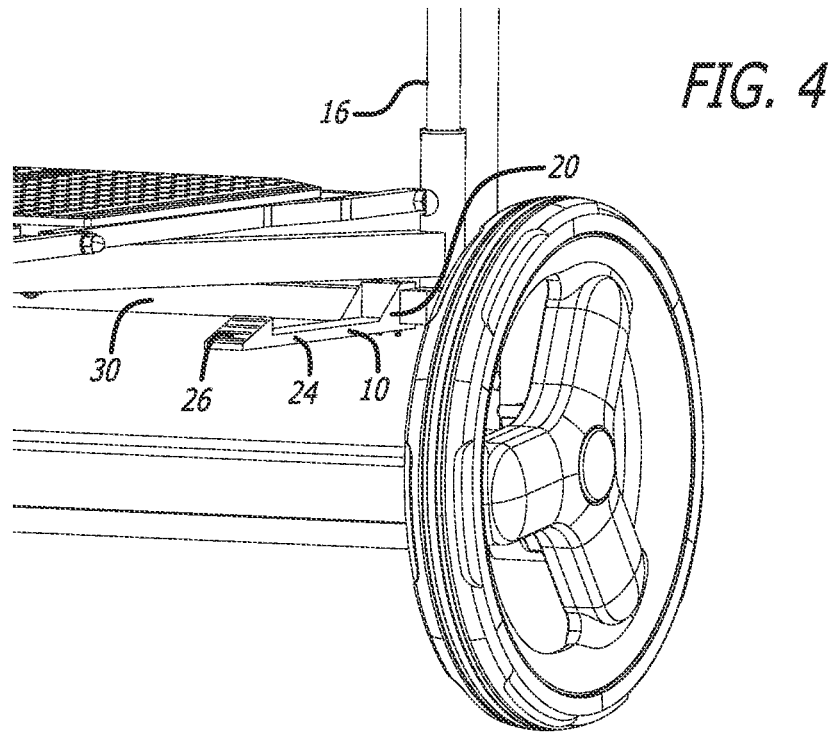
FIG. 4 is a partial front perspective view of the wagon and lock of FIG. 1, according to the present disclosure.

Referring to the figures, and initially to FIG. 1, there is shown a folding wagon 12 having a first frame 14 and a second frame 16. The wagon 12 can transition between the use position (FIGS. 1 and 4), and a folded position (FIGS. 9 and 10). The wagon 12 preferably has a lock 10 for securing the wagon 12 in the folded position, such as for storage and transport.

Figure 6:
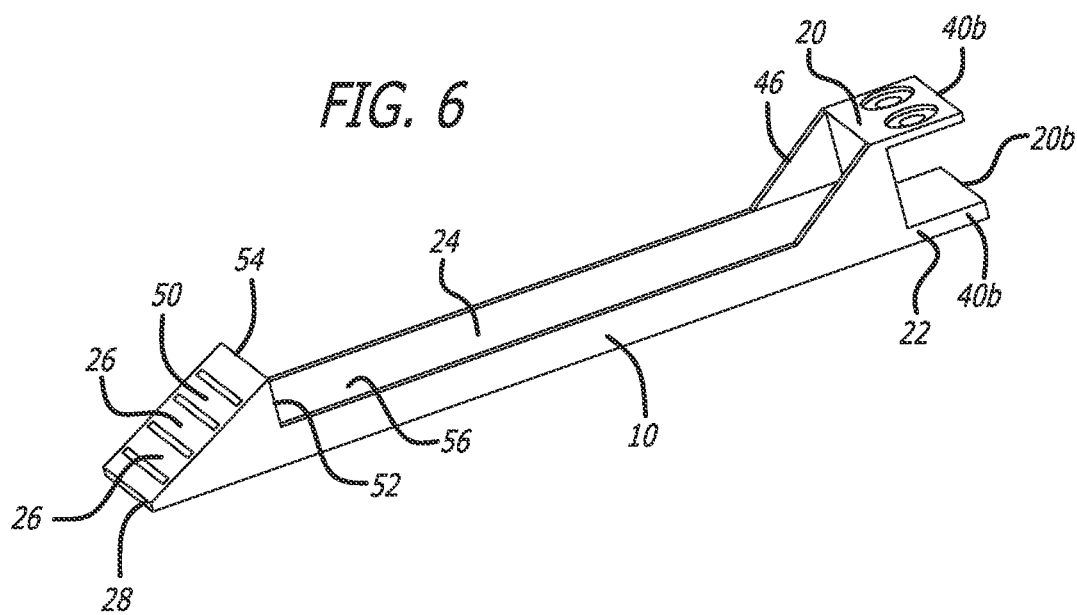
FIG. 6 is a front perspective view of the lock shown in FIG. 5, according to the present disclosure.
Figure 7:
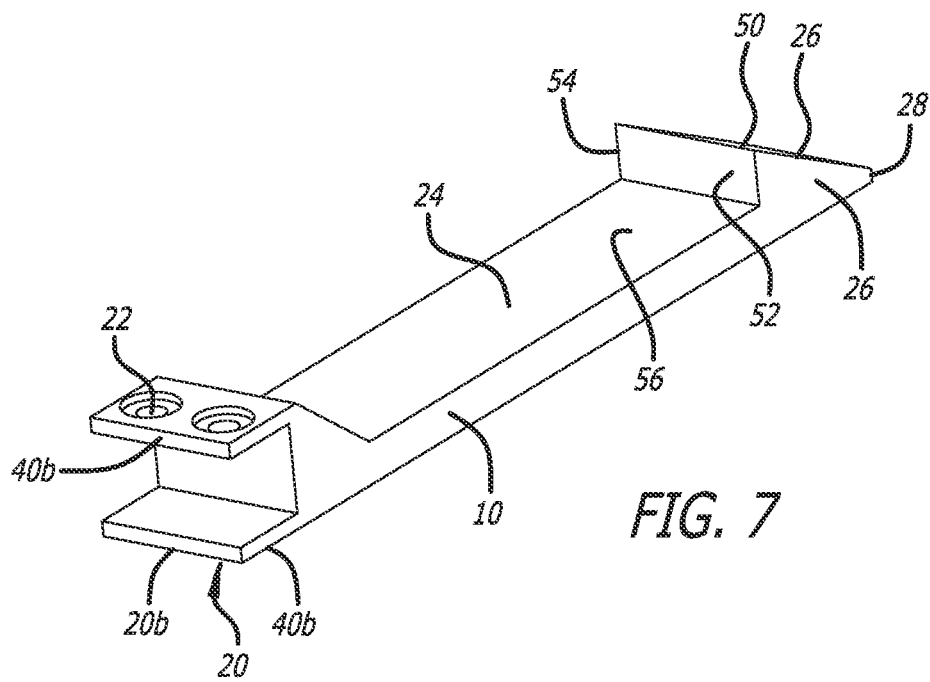
FIG. 7 is a rear perspective view of the lock shown in FIG. 5, according to the present disclosure.

In one embodiment, the lock 10 comprises an arm 24 having a first end 22 and a second end 28. A receiver 20 is provided at the first end 22 of the arm 24, and a latch 26 is provided at the opposing second end 28 of the arm 24. The receiver 20 is used to connect the lock 10 to the wagon 12, typically at either the first frame 14 or the second frame 16. In one embodiment, as shown in FIGS. 1-4, the receiver 20 is a vertical receiver 20a connected to a rear cross member 30 of the second frame 16. In an alternate embodiment, as shown in FIGS. 5-7, the receiver 20 is a horizontal receiver 20b connected to the rear cross member 30 of the second frame 16. Alternate types of receivers, however, may be utilized to secure the lock 20 to the wagon 10. In one embodiment the first frames 14 also has a cross member 32, and the receiver 20 may be alternately be secured thereto instead of the cross member 30 of the second frame 16. Further, in yet other embodiments not shown, the lock 10 may be secured to other components of the wagon 10. Referring to FIGS. 1, 2, 4 and 5, in one embodiment the lock 10 is connected to the rear cross member 30 of the second frame 16 of the wagon 12 such that the lock 10 extends back under the wagon 12 and towards the first frame 14 of the wagon 12. Alternately, the lock 10 may be connected to the cross member 32 of the first frame 14 of the wagon 12 such that the lock 10 extends back under the wagon 12 and towards the second frame 16 of the wagon 12. Further yet, if the wagon 12 folds differently the lock 10 may be connected to alternate components of the wagon 12.

In the embodiment of FIGS. 1-4 wherein the receiver 20 is a vertical receiver 20a, the vertical receiver 20a has two opposing flanges 40a extending generally transverse to a longitudinal axis of the arm 24 to receive the cross member 30 of the second frame 16. Conversely, in the embodiment of FIGS. 5-7, wherein the receiver 20 is a horizontal receiver 20b, the horizontal receiver 20b has two opposing flanges 40b extending generally in-line and or parallel with the longitudinal axis of the arm 24 to receive the cross member 30 of the second frame 16. The receivers 20a and 20b preferably can receive fasteners 44, such as, for example, bolts, to secure the lock 10 to the frame 16. Additionally, in one embodiment, the locks 10 have a gusset 46 between the receivers 20a, 20b and the arm 24 to provide additional strength and rigidity to the receivers 20a, 20b and the arm 24.

As shown in the figures, the lock 10 has a latch 26 toward the second end 28 of the arm 24. In one embodiment, the latch 26 has a ramp 50 and a shoulder 52. Further, in one embodiment, the ramp 50 extends from approximately the second end 28 of the lock 10 at an acute angle upward from the arm 24 toward the first end 22 of the lock 10. However, the ramp 50 does not extend all the way to the first end 22 of the lock 10, and generally has a length less than 30% of the overall length of the lock 10. The shoulder 52 extends from the second end 54 of the ramp 50 toward a top surface 56 of the arm 24. In one embodiment the shoulder 52 extends at a transverse angle to the arm 24, and in a preferred embodiment the shoulder 52 extends generally perpendicular to the top surface 56 of the arm 24.

In one embodiment, the latch 26 operates similarly to a single ratchet. Thus, in one embodiment, when the wagon 12 is transitioned from the use position to the folded position by the user, the first and second frame 14 and 16 are moved toward one another. During this transition, when the first and second frames 14 and 16 reach a certain distance from each other, the latch 26 of the lock 10 will begin to engage the opposing cross member, which in one embodiment is the cross member 32 of the first frame 14. In one embodiment, the lock 10 is made of a flexible material, such as a plastic. Further, in one embodiment the lock 10 is a molded part made of nylon. The lock 10 is able to flex slightly, but then return to its original position. In use, the receiver 20 of the lock 10 is fixed to the wagon frame. The first end 22 of the lock 10 with the latch 26, and specifically the ramp 50 of the latch 26, engages the cross member 32 of the first frame 14. As shown in FIGS. 9 and 10, as the first frame 14 of the wagon 12 is moved toward the second frame 16 to further fold the wagon 12, the cross member 32 of the first frame 14 will push the second end 28 of the arm 24 down against the ramp 50 of the latch 26. When the cross member 32 reaches the second end 54 of the ramp 50, and specifically the shoulder 52, the latch 10 will flex upwardly to secure the cross member 32 of the wagon frame against the shoulder 52 and prevent the wagon 12 from returning to the open position until desired by the user. To disengage the lock 10 and unfold the wagon, the user can either press down or step down on the latch 26 of the lock 10 to flex the second end 28 of the lock 10 downwardly and allow the cross member 32 to be released from the locking effect of the shoulder 52 of the latch 26.

The embodiments detailed hereinabove may be combined in full or in part, with any alternative embodiments described.

A reference to an element in the singular is not intended to mean "one and only one" unless specifically stated, but rather "one or more." The term "some" refers to one or more.

Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the Claims are not to be limited to the details given herein. Accordingly, while the specific embodiments have been illustrated and described, numerous modifications come to mind without significantly departing from the spirit of the disclosure and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A lock for a folding wagon, the folding wagon having a first frame member and an opposing second frame member, and a folding mechanism connecting the first frame member with the second frame member, the lock comprising:
   an arm having a first end and a second end;
   a receiver adjacent the first end of the arm, the receiver fixably connected to the first frame member of the wagon, the receiver comprising two opposing flanges extending from the arm; and,
   a latch adjacent the opposing second end of the arm, wherein the latch has a ramp and a shoulder, the ramp having a first end and a second end, the ramp extending from approximately the second end of the arm at an acute angle upward from the arm toward the first end of the arm, the shoulder extending from the second end of the ramp at a transverse angle to the arm and toward a top surface of the arm, wherein the shoulder is adapted to engage the second frame member when the folding wagon is moved to a folded position to secure the wagon in the folded position, and wherein the shoulder is adapted to disengage from the second frame member when the latch is moved downwardly to allow the wagon to move to a use position.

2. The lock of claim 1, wherein the receiver comprises two opposing flanges extending generally transverse to a longitudinal axis of the arm to receive the first frame member.

3. The lock of claim 1, wherein the receiver comprises two opposing flanges extending generally parallel to a longitudinal axis of the arm to receive the first frame member.

4. The lock of claim 1, further comprising fasteners to secure the receiver to the first frame member.

5. The lock of claim 1, further comprising a gusset between the receiver and the arm.

6. The lock of claim 1, wherein the ramp has a length less than 30% of an overall length of the lock.

7. The lock of claim 1, wherein the ramp does not extend all the way to the first end of the arm.

8. The lock of claim 1, wherein the shoulder extends generally perpendicular to the arm.

9. The lock of claim 1, wherein the lock is made of a plastic material, and wherein the second end of the arm is adapted to flex to engage and disengage the shoulder from the second frame member.

10. A lock for a folding wagon, the folding wagon having a first frame member and an opposing second frame member, and a folding mechanism connecting the first frame member with the second frame member, the lock comprising:

an arm having a first end and a second end;

a receiver adjacent the first end of the arm, the receiver secured to the first frame member of the wagon; and, a latch adjacent the second end of the arm, wherein the latch has a ramp and a shoulder, and wherein the arm flexes to allow the shoulder to engage the second frame member when the folding wagon is moved to a folded position to secure the wagon in the folded position and to allow the shoulder to disengage from the second frame member when the latch is flexed downwardly to allow the wagon to move from the folded position to a use position.

11. The lock of claim 10, wherein the receiver comprises two opposing flanges extending from the arm.

12. The lock of claim 10, wherein the ramp has a first end and a second end, the ramp extending from approximately the second end of the arm at an acute angle upward from the arm toward the first end of the arm, the shoulder extending from the second end of the ramp at a transverse angle to the arm and toward a top surface of the arm.

13. The lock of claim 10, wherein the ramp does not extend all the way to the first end of the arm.

14. The lock of claim 10, wherein the shoulder extends generally perpendicular to the arm.

15. The lock of claim 10, wherein the lock is made of a plastic material.

16. A lock for a folding wagon, the folding wagon having a first frame member and an opposing second frame member, and a folding mechanism connecting the first frame member with the second frame member, the lock comprising:

an arm having a first end and a second end;

a receiver adjacent the first end of the arm, the receiver connected to the first frame member of the wagon, the receiver comprising two opposing flanges extending from the arm; and, a latch adjacent the opposing second end of the arm, wherein the latch has a ramp and a shoulder, wherein the shoulder engages the second frame member to secure the wagon in the folded position, and wherein the shoulder is disengaged from the second frame member to allow the wagon to move from the folded position to a use position.

17. The lock of claim 16, wherein the ramp has a first end and a second end, the ramp extending from approximately the second end of the arm at an acute angle upward from the arm toward the first end of the arm, the shoulder extending from the second end of the ramp at a transverse angle to the arm and toward a top surface of the arm, wherein the shoulder is adapted to engage the second frame member when the folding wagon is moved to a folded position, and wherein the shoulder is adapted to disengage from the second frame member when the latch is moved downwardly.

18. The lock of claim 17, wherein the ramp does not extend all the way to the first end of the arm, and wherein the shoulder extends generally perpendicular to the arm.

19. The lock of claim 16, wherein the receiver comprises two opposing flanges extending from the arm, and further comprising a fastener to secure the receiver to the first frame member.

20. The lock of claim 16, wherein the arm flexes to allow the shoulder to engage the second frame member when the folding wagon is moved to a folded position and to allow the shoulder to disengage from the second frame member when the latch is flexed downwardly.

* * * * *